United States Patent [19]

Iwanami et al.

[11] Patent Number: 4,954,557
[45] Date of Patent: Sep. 4, 1990

[54] PROCESS FOR PREPARING MOLDED ARTICLE

[75] Inventors: Teruo Iwanami, Ibaraki; Shigeo Miyata, Takamatsu; Takamasa Moriyama, Suita, all of Japan

[73] Assignees: Nippon Gohsei Kagaku Kogyo Kabushiki Kaisha, Osaka; Kyowa Kogyo Kabushiki Kaisha, Kagawa, both of Japan

[21] Appl. No.: 301,903

[22] Filed: Jan. 25, 1989

[51] Int. Cl.$^5$ .................. C08K 3/26; C08K 3/24; C08L 29/04; C08L 23/02
[52] U.S. Cl. .................. 524/399; 524/434; 524/436; 524/503; 524/400
[58] Field of Search .............. 524/503, 434, 436, 399, 524/400

[56] References Cited

U.S. PATENT DOCUMENTS

| | | | |
|---|---|---|---|
| 4,675,356 | 6/1987 | Miyata | 524/434 |
| 4,704,423 | 11/1987 | Iwanami | 524/503 |
| 4,761,188 | 8/1988 | Miyata | 524/436 |
| 4,822,547 | 4/1989 | Derrick | 524/436 |

FOREIGN PATENT DOCUMENTS 2038844 7/1980 United Kingdom ............... 524/436

Primary Examiner—C. Warren Ivy
Attorney, Agent, or Firm—Antonelli, Terry, Stout & Kraus

[57] ABSTRACT

In a process for preparing a molded article by melt-molding a mixture of (A) a hydrolyzed ethylene-vinyl acetate copolymer having an ethylene content of 20 to 80% by mole and a degree of hydrolysis in the vinyl acetate units of at least 90% by mole and (B) an olefin resin, the improvement which comprises melt-molding said mixture in the presence of a hydrotalcite solid solution (C) having the formula (I):

$$\{(M_1^{2+})_{y_1}(M_2^{2+})_{y_2}\}_{1-x}(M^{3+})_x(OH)_2(A^{n-})_{x/n}\cdot mH_2O \quad (I)$$

According to the process of the present invention, long run processability during melt-molding can be remarkably improved, and the obtained molded article has excellent qualities, e.g., the film has few fish eyes.

7 Claims, No Drawings

PROCESS FOR PREPARING MOLDED ARTICLE

BACKGROUND OF THE INVENTION

The present invention relates to a process for preparing a molded article from a mixture of an olefin resin and a hydrolyzed ethylene-vinyl acetate copolymer (hereinafter referred to as "EVOH"), and more particularly to a process for preparing a molded article having excellent long run processability during melt-molding and capable of giving molded articles having remarkably improved quality.

Various molded articles can be obtained by melt-molding mixtures of an olefin resin such as polyethylene or polypropylene and EVOH. Objects of the melt-molding are (1) to provide molded articles having physical properties which cannot be obtained from use of only one of the olefin resin and EVOH, as discussed in, for instance, Japanese Examined Patent Publication No. 1032/1967 and No. 44579/1974, Japanese Unexamined Patent Publication Nos. 7038/1973, 65544/1975 and 122950/1983, and the like, or (2) to reuse waste articles such as scraps or cut edges of the molded articles produced during laminating and inferior goods.

When melt-molding the mixture of the olefin resin and EVOH to give molded articles such as films and sheets, there are some problems that the mixture gells, and colored resins or carbonized resins, which are generated by occurrence of thermal decomposition, adhere to an inner wall of an extruder during melt-molding. As a result, melt-molding cannot be continuously conducted for a long period of time. In other words, so-called long run processability is poor. Also, since the gelled material is often incorporated into the molded article, the obtained molded articles are inferior in quality, for instance, fish eyes are generated on the film.

When reusing waste articles (scraps or cut edges of laminates, inferior goods, and so on) of the laminates of the olefin resin and EVOH, it is particularly important to solve the above-mentioned problems.

In fact, recently, there have been few cases where the olefin resin or EVOH is molded singly to give wrapping or packaging materials such as films, sheets, containers or bottles and there have been many cases where they are laminated, if necessary using an adhesive, to give multi-layer laminates of the olefin resin layer and the EVOH layer, since in the market the wrapping or packaging materials are required to have multi-function. In such a laminating, generally, a lot of waste articles such as scraps or cut edges of the laminates and inferior goods are generated. It is required to reuse of the waste articles in the art.

The long run processability is not very poor when EVOH or the olefin resin is molded singly, but it becomes remarkably poor when molding the olefin resin with EVOH even if using a slight amount of EVOH. In melt-molding of the mixture of the olefin resin and EVOH, screen meshes are very often choked with the gelled materials, or melted resins adhere to a screw in an extruder. At every times when the screen meshes are choked or the melted resins adhere to the screw, remarkable troublesome operations such that the extruder is disassembled than the screen and the screw are cleaned up are required.

In order to improve the long run processability in melt-molding of the mixture of olefin resin and EVOH and provide molded articles having excellent quality, Japanese Unexamined Patent Publications No. 15243/1987 and No. 179530/1987 have proposed that a hydrotalcite compound is added to the olefin resin and EVOH, then the mixture is molded. However, according to the process, there are problems that improvement of long run processability is insufficient, that is, melt-molding can be continuously carried out for about 10 days at most, a bad smell is given out during melt-molding, the molded articles are colored, and the like.

An object of the present invention is to provide a process for preparing a molded articles having good long run processability and capable of providing molded articles having remarkably improved quality.

This and other objects of the present invention will become apparent from the description thereof.

SUMMARY OF THE INVENTION

In accordance with the present invention, there is provided, in a process for preparing a molded article by melt-molding a mixture of (A) a hydrolyzed ethylene-vinyl acetate copolymer having an ethylene content of 20 to 80 % by mole and a degree of hydrolysis in the vinyl acetate units of at least 90 % by mole and (B) an olefin resin, the improvement which comprises melt-molding the component (A) and the component (B) in the presence of (C) a hydrotalcite solid solution having the formula (I):

$$\{(M_1^{2+})_{y1}(M_2^{2+})_{y2}\}_{1-x}(M^{3+})_x(OH)_2(A^{n-})_{x/n} \cdot m\text{H}_2\text{O} \quad (I)$$

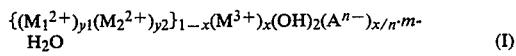

wherein $M_1^{2+}$ is at least one metal selected from Mg, Ca, Sr and Ba; $M_2^{2+}$ is Zn, Cd, Pb or Sn; $M^{3+}$ is a trivalent metal; $A^{n+}$ is an anion with a valence of n; x is a positive number satisfying the equation: $0 < x \leq 0.5$; y1 and Y2 are respectively positive numbers satisfying the equations: $0.5 < y1 < 1$ and $y1 + y2 = 1$; and m is a positive number satisfying the equation: $0 \leq m < 2$. According to the process of the present invention, the gelation during melt-molding can be remarkably prevented, resulting in improvement of long run processability, a bad smell is not given out, and the obtained molded articles are not colored.

Further, when melt-molding the components (A) and (B) in the presence of (D) a metal salt of a higher fatty acid having 10 to 22 carbon atoms with the hydrotalcite solid solution (C), the adhesion of the melted mixture to an inner wall of an extruder can be prevented, in other words, an effect obtained by using a lubricant can be obtained. Accordingly, long run processability can be further improved.

DETAILED DESCRIPTION

Gel formation during melt-molding of the mixture of the EVOH (A) and the olefin resin (B) can be prevented only when the components (A) and (B) are melt-molded in the presence of the hydrotalcite solid solution (C), or in addition to the component (C), the metal salt of the higher fatty acid (D).

In the present invention, a mixing ratio of the EVOH (A) to the olefin resin (B) is not particularly limited. Generally, the effect of the present invention can be extremely exhibited when the ratio of the EVOH (A) to the olefin resin (B) is from 0.1 to 40% by weight, preferably 0.5 to 20% by weight, since the mixture having the above-mentioned ratio range gells remarkably.

The EVOH (A) used in the invention is an EVOH having an ethylene content of 20 to 80% by mole, preferably 25 to 70% by mole, and a degree of hydrolysis in vinyl acetate units of at least 90% by mole, preferably at least 97% by mole. When the ethylene content is less than 20% by mole, the thermal stability is poor, so the melt-processability is lowered. On the other hand, when the ethylene content is more than 80% by mole, the oxygen impermeability is lowered. Also, in such a case, there is no necessity of addition of the hydrotalcite solid solution (C) to the mixture because the component EVOH (A) becomes to approximate to polyethylene, thus the gelation of the mixture is hardly caused.

When the EVOH (A) has the degree of hydrolysis in vinyl acetate units of less than 90% by mole, the physical properties such as the heat stability, oxygen impermeability, oil resistance and water resistance are poor.

The EVOH (A) used in the invention may include a third component in a small amount, i.e., less than about 10% by mole in addition to the ethylene units and the vinyl acetate or hydrolyzed vinyl acetate units. Examples of the third components are, for instance, unsaturated carboxylic acids or their esters and salts; unsaturated sulfonic acids or their salts; acrylamide or methacrylamide; acrylonitrile or methacrylonitrile; α-olefins such as propylene, butene, α-octene and α-octadecene; vinyl esters other than vinyl acetate, and the like.

As the olefin resin (B) used in the invention, there are exemplified, for instance, a high density, intermediate density or low density olefin homopolymer such as polyethylene, polypropylene, polybutene or polypentene; ethylene-propylene copolymer; a copolymer of ethylene or propylene as a main component with an α-olefin having about 4 to about 20 carbon atoms such as 1-butene or 1-hexene; an olefin-vinyl acetate copolymer containing not less than 90% by mole of an olefin such as ethylene or propylene; a copolymer of an olefin with an acrylic ester or methacrylic ester; a graft-modified olefin homopolymer or copolymer as mentioned above with an unsaturated carboxylic acid, and the like. The above-mentioned olefin resins (B) can be employed alone or as an admixture thereof. Among them, when in melt-molding of the EVOH (A) and the olefin resin (B), using polyethylene having a melt index at 210° C. of 0.1 to 15 or polypropylene having a melt index at 210° C. of 0.2 to 12 as the component (B), gelation easily occurs. Accordingly, the effect of the invention can be extremely exhibited in case of using the above-mentioned polyethylene or polypropylene.

The most distinctive feature of the present invention is that the EVOH (A) and the olefin resin (B) are melt-molded in the presence of the hydrotalcite solid solution (C) having the formula (I):

$$\{(M_1^{2+})_{y1}(M_2^{2+})_{y2}\}_{1-x}(M^{3+})_x(OH)_2(A^{n-})_{x/n} \cdot mH_2O \quad (I)$$

wherein $M_1^{2+}$ is at least one metal selected from Mg, Ca, Sr and Ba; $M_2^{2+}$ is Zn, Cd, Pb or Sn; $M^{3+}$ is a trivalent metal; $A^{n-}$ is an anion with a valence of n; n is an integer of 1 to 4 and each x, y1, y2 and m is a positive number and satisfies the following equation: $0 < x \leq 0.5$, $0.5 < y1 < 1$, $y1 + y2 = 1$, $0 \leq m < 2$. In the formula (I), Mg and Ca are preferable as the metal $M_1^{2+}$, and Zn and Cd are preferable as the metal $M_2^{2+}$. As the metal $M^{3+}$, there are exemplified, for instance, Al, Bi, In, Sb, B, Ga, Ti, and the like. Among them, Al is practically used. Examples of the anion $A^{n+}$ are, for instance, $CO_3^{2-}$, $OH^-$, $HCO_3^-$, salicylate ion, $ClO_4^-$, $CH_3COO^-$, citrate ion, tartarate ion, $NO_3^-$, $I^-$,

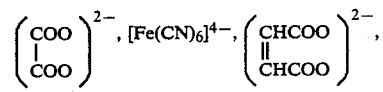

Among them, $CO_3^{2-}$ is useful.

The hydrotalcite solid solutions (C) may be subjected to surface treatment with higher fatty acids, anionic surface active agents, silane coupling agents, titanate coupling agents, fatty acid esters of glycerol, or the like.

Typical examples of the hydrotalcite solid solutions (C) are, for instance, $\{Mg_{0.75} Zn_{0.25}\}_{0.67} Al_{0.33} (OH)_2 (CO_3)_{0.165} \cdot 0.45H_2O$, $\{Mg_{0.79} Zn_{0.21}\}_{0.7} Al_{0.3} (OH)_2 (CO_3)_{0.15}$,

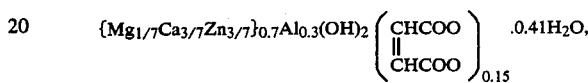

$\{Mg_{6/7} Cd_{1/7}\}_{0.7} Al_{0.3} (OH)_2 (CH_3COO)_{0.3} \cdot 0.34H_2O$, $\{Mg_{5/7} Pb_{2/7}\}_{0.7} Al_{0.30} (OH)_2 (CO_3)_{0.15} \cdot 0.52H_2O$, $\{Mg_{0.74} Zn_{0.26}\}_{0.68} Al_{0.32} (OH)_2 (CO_3)_{0.16}$, $\{Mg_{0.56} Zn_{0.44}\}_{0.68} Al_{0.32} (OH)_2 (CO_3)_{0.16} \cdot 0.2H_2O$, $\{Mg_{0.81} Zn_{0.19}\}_{0.74} Al_{0.26} (OH)_2 (CO_3)_{0.13}$, $\{(Mg_{0.75} Zn_{0.25}\}_{0.80} Al_{0.20} (OH)_2 (CO_3)_{0.10} \cdot 0.16H_2O$, $\{Mg_{0.71} Zn_{0.29}\}_{0.7}Al_{0.30} (OH)_2 (NO_3)_{0.30}$,

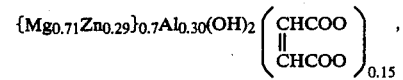

$\{Mg_{0.14} Ca_{0.57} Zn_{0.29}\}_{0.70} Al_{0.30} (OH)_{2.3} \cdot 0.25H_2O$, and the like.

The amount of the hydrotalcite solid solution (C) to the mixture of the EVOH (A) and the olefin resin (B) is not particularly limited. It is preferable that the amount of the solid solution (C) is from 50 to 20,000 ppm, preferably from 80 to 10,000 ppm, based on the mixture of the EVOH (A) and the resin (B). When the amount of the solid solution (C) is less than 50 ppm, the effect for preventing gelation is hard to obtain. On the other hand, even if more than 20,000 ppm of the solid solution (C) is used, any more effect cannot be expected, which is uneconomical.

The hydrotalcite solid solution (C) can be added to the mixture at any time so long as the mixture of the EVOH (A) and the olefin resin (B) is melt-molded in the presence of the solid solution (C). For example, there can be adopted a method in which after the solid solution (C) is previously added to either the EVOH (A) or the olefin resin (B), or both the EVOH (A) and the resin (B), the EVOH (A) is mixed with the resin (B), and then the mixture is subjected to melt-molding, a method in which the solid solution (C) is added to the mixture of the EVOH (A) and the olefin resin (B), and the mixture is subjected to melt-molding, or the like.

In the present invention, the metal salt of the higher fatty acid (D) having 10 to 22 carbon atoms may be used with the hydrotalcite solid solution (C). When the mixture of the EVOH (A) and the olefin resin (B) is melt-molded in the presence of both the solid solution (C) and the metal salt of the higher fatty acid (D), not only the gelation can be prevented but also an effect obtained by adding a lubricant can be obtained. Therefore, it is more effective to improve the long run processability.

Examples of the higher fatty acids of the metal salts of the higher fatty acid (D) are, for instance, lauric acid, tridecylic acid, myristic acid, pentadecylic acid, palmitic acid, heptadecylic acid, stearic acid, nonadecanoic acid, and the like. Examples of the metal salts are, for instance, alkali metal salts such as a sodium salt and a potassium salt, alkaline earth metal salts such as a magnesium salt, a calcium salt and a barium salt, zinc salts, and the like. Among the metal salts of the fatty acid (D), the metal salts of stearic acid is remarkably effective. The metal salt of the higher fatty acid (D) may be employed alone or as an admixture thereof.

The amount of the metal salt of the higher fatty acid (D) is from 50 to 10,000 ppm, preferably from 80 to 8,000 ppm, based on the mixture of the EVOH (A) and the olefin resin (B). When the amount is less than 50 ppm, the effect obtained by adding the metal salt (D) cannot be obtained, and on the other hand, when the amount is more than 10,000 ppm, not only it is economically disadvantageous but the extrusion-processability become poor and physical properties of the molded articles are lowered. The metal salt (D) can be added at any time to the EVOH (A) and the olefin resin (B), similar to the case of the solid solution (C). Also, the metal salt (D) may be mixed with the solid solution (D) previously and the mixture is added to the system of the EVOH (A) and the olefin resin (B).

In the invention, any methods are suitably applied to admix the solid solution (C), or the solid solution (C) and the metal salt (D) with the mixture of the EVOH (A) and the olefin resin (B). For instance, the solid solution (C), or the metal salt (D) in addition to the solid solution (C) is added to powders or pellets of the EVOH (A) and the olefin resin (B), or scraps, cut edges or inferior articles of a laminate of the EVOH (A) layer and the olefin resin (B) layer, and mixture is mixed in a Henschel mixer, tumbler, or the like. Then, the mixture is melt-molded in an extruder to give products having a desired shape, or the mixture is formed into pellets and the pellets are formed into products having a desired shape.

In the invention, it is preferable that the mixture is melt-molded at a temperature of about 160° to about 260° C. Upon melt-molding, if necessary, the mixture may suitably contain a known additive such as a reinforcement, e.g., a glass fiber or carbon fiber, a lubricant, e.g., a polyethylene having a low molecular weight, a polypropylene having a low molecular weight, a paraffin, an amide lubricant or an epoxy lubricant; a filler, a coloring agent, a stabilizer and a blowing agent. Also, each of the EVOH (A) and the olefin resin (B) or their mixture may include a thermoplastic resin as a modifier in a suitable amount.

Any molding methods are applicable to melt-molding of the mixture in the invention, such as injection molding, compression molding and extrusion. Examples of the extrusion are, for instance, T-die extrusion, blow molding, pipe extrusion, wire extrusion, profile die extrusion, tubular film process, and the like.

The molded articles according to the present invention can be in any states, for instance, films, sheets, tapes, bottles, pipes, filaments, profiles, and the like. Further, in the invention a laminate composed of a layer prepared according to the present invention and a layer of an other resin is important.

In laminating, as the other resin to be laminated with the molded article according to the invention, high gas barrier resins such as an EVOH, a polyamide resin, i.e., nylon 6 or nylon 6,6 and a vinylidene chloride resin are often used, since the laminates are often required to have high gas barrier property. Thermoplastic resins other than the above-mentioned resin can be used, of course. Examples of the thermoplastic resins are, for instance, polycarbonates, vinyl chloride resins, acrylic resins, polystyrenes, polyvinyl esters, polyesters, polyester elastomers, polyurethene elastomers, polyacetals, chlorinated polyethylenes, chlorinated polypropylenes, the above-mentioned polyolefins, and the like.

The laminate is composed of a layer (a) of the molded article according to the present invention, a layer (b) of the other resin (the high gas barrier resin as a main component) and (c) an adhesive layer which is provided as occasion demands. The laminates can have any layer structures. When the laminates are films, sheets or bottles, the laminates can have a multi-layer structure such as (a)/(b)/(a), (b)/(a)/(b), $(b_1)/(b_2)/(a)$, $(b)/(a_1)/(a_2)$, (a)/(b)/(a)/(b)/(a), $(a_2)/(a_1)/(b)/(a_1)/(a_2)$, (a)/(c)/(b), (a)/(c)/(b)/(c)/(a), (b)/(c)/(a)/(c)/(b) or (a)/(c)/(b)/(c)/(a)/(c)/(b)/(c)/(a) as well as a two-layer structure such as (a)/(b). When the laminates are filaments, the laminates can have any structures such as a bimetal type of (a) and (b), a skin-core type of (a) and (b), an eccentricity type of (a) and (b), and the like. Also, either (a) or (b), or both (a) and (b) may be blended with other resins, for instance, a resin capable of giving adhesion to the resins.

The obtained melt-molded articles, coextruded articles or extrusion-coated articles can be, if necessary, subjected with heat-treatment, cold-treatment, rolling, uniaxial or biaxial orientation, printing treatment, dry-laminating treatment, solution or melt coating treatment, bag-making working, deep drawing working, box-making working, tubing working, split working, and the like.

According to the process of the present invention, gelation on melt-molding can be remarkably prevented. Accordingly, melt-molding can be carried out continuously for a long period of time without gel formation, that is, the long run processability is improved. Since formation of the gel can be prevented, incorporation of the gel into the molded article can be prevented. Further, coloration and carbonization can be remarkably decreased, so the colored or carbonized resins rarely adheres to the inner wall of the extruder during molding, thus resulting in remarkable improvement of the long run processability. The obtained molded article has excellent quality, e.g., the film has few fish eyes. The effects of the present invention influences the quality of the laminates wherein the layer prepared by the invention is contained.

The molded articles according to the invention are suitable for use of various uses, e.g. films for wrapping or packaging including films for wrapping or packaging foods, vessels, bottles, trays for foods, sheets, parts of machines, and the like.

The present invention is more specifically described and explained by means of the following Examples, in which all parts and % are by weight unless otherwise noted. It is to be understood that the present invention is not limited to Examples, and various changes and modifications may be made in the invention without departing from the spirit and scope thereof.

EXAMPLES 1 TO 23

A hydrotalcite solid solution (C) shown in Table 1 was added to 100 parts of an olefin resin shown in Table 1 in an amount shown in Table 1 and the mixture was melt-kneaded to give pellets. An EVOH shown in Table 1 was mixed with 100 parts of the obtained pellets in an amount shown in Table 1, and the mixture was extruded under the following conditions to give a film having a thickness of 30 μ.

Molding Condition

Extruder: Extruder having a diameter of 40 mm
Screw: L/D=26, compression ratio=3.5
Screen mesh : 60/120/60 mesh
Dye: Fishtail die
Extrusion temperature:
Front part of cylinder: 230° C.
Die: 210° C.
Screw speed: 75 rpm Gel formation in the extruder during molding, long run processability and quality of the obtained film were estimated by the following method.

The results are shown in Table 1.

(1) Gel Formation

After extrusion was continuously conducted for 72 hours, the extruder was disassembled. The screen mesh and the screw were observed with the naked eye.

The state of the screen mesh as to adhesion of gel is estimated according to evaluation of five stages wherein 1 in Table 1 shows that the gel does not adhere to the screen mesh at all and 5 shows that the gel adheres to all over the surface of the screen mesh.

The state of the screw as to adhesion of thermal decomposed material is estimated according to evaluation of five stages wherein 1 in Table 1 shows that the thermal decomposed material does not adhere to the screw at all and 5 shows that the thermal decomposed material adheres to all over the surface of the screw.

(2) Long Run Processability

During continuous extrusion for 25 days, whether fluctuation of torque, fluctuation of resin pressure, surging (fluctuation of discharge) or lowering of discharge occurs or not is shown.

(3) Quality Of Film

The number of fish eyes having a diameter of at least 0.4 mm observed in an area of 100 cm$^2$ of the film is counted, using a magnifier.

1: From 0 to 5/100 cm$^2$
2: From 6 to 10/100 cm$^2$
3: From 11 to 50/100 cm$^2$
4: From 51 to 200/100 cm$^2$
5: Not less than 201/100 cm$^2$

TABLE 1

| | EVOH (A) Kind | EVOH (A) Amount (part) | Olefin resin (B) Kind | Olefin resin (B) Amount (part) | Hydrotalcite solid solution (C) Kind | Amount based on the mixture of (A) and (B) (ppm) |
|---|---|---|---|---|---|---|
| Ex. 1 | (A-1)*$^1$ | 2 | (B-1)*$^3$ | 100 | $\{Mg_{0.75}Zn_{0.25}\}_{0.67}Al_{0.33}(OH)(CO_3)_{0.165} \cdot 0.45H_2O$ | 500 |
| Ex. 2 | " | 2 | " | 100 | " | 2000 |
| Ex. 3 | " | 2 | " | 100 | " | 7000 |
| Ex. 4 | " | 10 | " | 100 | " | 100 |
| Ex. 5 | " | 25 | " | 100 | " | 500 |
| Ex. 6 | " | 25 | " | 100 | " | 15000 |
| Ex. 7 | " | 5 | " | 100 | $\{Mg_{0.79}Zn_{0.21}\}_{0.7}Al_{0.3}(OH)_2(CO_3)_{0.15}$ | 500 |
| Ex. 8 | " | 25 | " | 100 | $\{Mg_{6/7}Cd_{1/7}\}Al_{0.3}(OH)_2(CH_3COO)_{0.3} \cdot 0.34H_2O$ | 500 |
| Ex. 9 | (A-1) | 2 | (B-1) | 100 | $\{Mg_{1/7}Ca_{3/7}Zn_{3/7}\}_{0.7}Al_{0.3}(OH)_2\left(\begin{array}{c}CHCOO\\ \| \\ CHCOO\end{array}\right)_{0.15} \cdot 0.41H_2O$ | 500 |
| Ex. 10 | " | 2 | " | 100 | $\{Mg_{5/7}Pb_{2/7}\}_{0.7}Al_{0.30}(OH)_2(CO_3)_{0.15} \cdot 0.52H_2O$ | 500 |
| Ex. 11 | " | 2 | (B-2)*$^4$ | 100 | $\{Mg_{0.75}Zn_{0.25}\}_{0.67}Al_{0.33}(OH)_2(CO_3)_{0.165} \cdot 0.45H_2O$ | 500 |
| Ex. 12 | " | 2 | " | 100 | $\{Mg_{6/7}Cd_{1/7}\}_{0.7}Al_{0.3}(OH)_2(CH_3COO)_{0.3} \cdot 0.34H_2O$ | 500 |
| Ex. 13 | " | 2 | " | 100 | $\{Mg_{1/7}Ca_{3/7}Zn_{3/7}\}_{0.7}Al_{0.3}(OH)_2\left(\begin{array}{c}CHCOO\\ \| \\ CHCOO\end{array}\right)_{0.15} \cdot 0.41H_2O$ | 500 |
| Ex. 14 | " | 2 | (B-3)*$^5$ | 100 | $\{Mg_{0.75}Zn_{0.25}\}_{0.67}Al_{0.33}(OH)_2(CO_3)_{0.165} \cdot 0.45H_2O$ | 500 |
| Ex. 15 | " | 5 | " | 100 | $\{Mg_{5/7}Pb_{2/7}\}_{0.7}Al_{0.30}(OH)_2(CO_3)_{0.15} \cdot 0.52H_2O$ | 500 |
| Ex. 16 | (A-1) | 2 | (B-4)*$^6$ | 100 | $\{Mg_{0.75}Zn_{0.25}\}_{0.67}Al_{0.33}(OH)_2(CO_3)_{0.165} \cdot 0.45H_2O$ | 500 |
| Ex. 17 | " | 5 | " | 100 | $\{Mg_{5/7}Pb_{2/7}\}_{0.7}Al_{0.30}(OH)_2(CO_3)_{0.15} \cdot 0.52H_2O$ | 500 |
| Ex. 18 | (A-2)*$^2$ | 2 | (B-1) | 100 | $\{Mg_{0.75}Zn_{0.25}\}_{0.67}Al_{0.33}(OH)_2(CO_3)_{0.165} \cdot 0.45H_2O$ | 500 |
| Ex. 19 | " | 2 | " | 100 | $\{Mg_{6/7}Cd_{1/7}\}_{0.7}Al_{0.3}(OH)_2(CH_3COO)_{0.3} \cdot 0.34H_2O$ | 500 |
| Ex. 20 | " | 2 | " | 100 | $\{Mg_{1/7}Ca_{3/7}Zn_{3/7}\}_{0.7}Al_{0.3}(OH)_2\left(\begin{array}{c}CHCOO\\ \| \\ CHCOO\end{array}\right)_{0.15} \cdot 0.41H_2O$ | 500 |
| Ex. 21 | " | 2 | " | 100 | $\{Mg_{5/7}Pb_{2/7}\}_{0.7}Al_{0.30}(OH)_2(CO_3)_{0.15} \cdot 0.52H_2O$ | 500 |
| Ex. 22 | " | 5 | (B-2) | 100 | $\{Mg_{0.75}Zn_{0.25}\}_{0.67}Al_{0.33}(OH)_2(CO_3)_{0.165} \cdot 0.45H_2O$ | 1000 |
| Ex. 23 | " | 2 | " | 100 | $\{Mg_{5/7}Pb_{2/7}\}_{0.7}Al_{0.30}(OH)_2(CO_3)_{0.15} \cdot 0.52H_2O$ | 500 |

Gel formation

TABLE 1-continued

| | | Screen | Screw | Long run processability | Fish eyes |
|---|---|---|---|---|---|
| | Ex. 1 | 1 | 2 | No fluctuation | 1 |
| | Ex. 2 | 1 | 2 | No fluctuation | 1 |
| | Ex. 3 | 1 | 2 | No fluctuation | 1 |
| | Ex. 4 | 3 | 3 | A little fluctuation of torque and fluctuation of resin pressure occured after 60 hours. | 3 |
| | Ex. 5 | 1 to 2 | 2 | No fluctuation | 1 |
| | Ex. 6 | 1 to 2 | 2 | No fluctuation | 1 |
| | Ex. 7 | 1 to 2 | 2 | No fluctuation | 1 |
| | Ex. 8 | 2 to 3 | 3 | A little fluctuation of torque occured after 90 hours. | 2 |
| | Ex. 9 | 2 to 3 | 3 | A little fluctuation of torque occured after 140 hours. | 2 |
| | Ex. 10 | 2 | 2 | A little fluctuation of torque occured after 160 hours. | 2 |
| | Ex. 11 | 1 | 2 | No fluctuation | 1 |
| | Ex. 12 | 2 | 3 | A little fluctuation of resin pressure occured after 140 hours. | 2 |
| | Ex. 13 | 2 to 3 | 3 | A little fluctuation of torque occured after 100 hours. | 1 |
| | Ex. 14 | 1 | 2 | No fluctuation | 1 |
| | Ex. 15 | 1 to 2 | 3 | A little fluctuation of torque occured after 140 hours. | 1 |
| | Ex. 16 | 1 | 2 | No fluctuation | 1 |
| | Ex. 17 | 1 to 2 | 2 | A little fluctuation of torque occured after 170 hours. | 1 |
| | Ex. 18 | 1 | 2 | No fluctuation | 1 |
| | Ex. 19 | 2 to 3 | 3 | A little fluctuation of torque occured after 120 hours. | 2 |
| | Ex. 20 | 2 to 3 | 3 | A little fluctuation of torque occured after 100 hours. | 2 |
| | Ex. 21 | 1 | 3 | A little fluctuation of torque occured after 140 hours. | 1 |
| | Ex. 22 | 1 | 2 | No fluctuation | 1 |
| | Ex. 23 | 1 to 2 | 2 | A little fluctuation of torque occured after 180 hours. | 2 |

Notes:
EVOH
(A-1)*[1]: EVOH having an ethylene content of 31% by mole, a degree of hydrolysis in vinyl acetate units of 99.1% by mole, and a melt index (MI) at 210° C. of 4.0
(A-2)*[2]: EVOH having an etylene content of 40% by mole, a degree of hydrolysis in vinyl acetate units of 99.3% by mole, and an MI at 210° C. of 7.5
Olefin resin
(B-1)*[3]: Polypropylene having an MI at 210° C. of 1.0 and a specific gravity of 0.890
(B-2)*[4]: High density polyethylene (HDPE) having an MI at 210° C. of 0.8 and a density of 0.960
(B-3)*[5]: High density polyethylene (HDPE) having an MI at 210° C. of 6.5 and a density of 0.968
(B-4)*[6]: Linear low density polyethylene (LLDPE) having an MI at 210° C. of 1.0 and a density of 0.922

COMPARATIVE EXAMPLE 1

The procedure of Example 1 was repeated except that the hydrotalcite solid solution (C) was not used to give a film.

Gel formation in the extruder during molding, long run processability and quality of the film were estimated in the same manner as in Example 1.

The results are shown in Table 2.

COMPARATIVE EXAMPLE 2

The procedure of Example 4 was repeated except that the hydrotalcite solid solution (C) was not used to give a film.

Gel formation in the extruder during molding, long run processability and quality of the film were estimated in the same manner as in Example 1.

The results are shown in Table 2.

COMPARATIVE EXAMPLES 3 AND 4

A film was prepared from the polypropylene (B-1) alone without the hydrotalcite solid solution (C) (Comparative Example 3), or the EVOH (A-1) alone without the hydrotalcite solid solution (C) (Comparative Example under the same molding conditions as in Example 1.

Gel formation in the extruder during molding, long run processability and quality of the film were estimated in the same manner as in Example 1.

The results are shown in Table 2.

TABLE 2

| | EVOH (A) | | Olefin resin (B) | | Hydrotalcite solid solution (C) | |
|---|---|---|---|---|---|---|
| | Kind | Amount (part) | Kind | Amount (part) | Kind | Amount (ppm) |
| Com. Ex. 1 | (A-1) | 2 | (B-1) | 100 | — | 0 |
| Com. Ex. 2 | " | 10 | " | 100 | — | 0 |
| Com. Ex. 3 | — | 0 | " | 100 | — | 0 |
| Com. Ex. 4 | (A-1) | 100 | — | 0 | — | 0 |

| | Gel formation | | | Fish |
|---|---|---|---|---|
| | Screen | Screw | Long run processibility | eyes |
| Com. Ex. 1 | 5 | 5 | Fluctuation of torque, fluctuation of resin pressure and surging occured after 12 hours. | 5 |
| Com. Ex. 2 | 5 | 5 | Fluctuation of torque, fluctuation of resin pressure and surging occured after 6 hours. | 5 |
| Com. Ex. 3 | 1 | 1 | No fluctuation | 1 |
| Com. Ex. 4 | 4 | 3 | No fluctuation | 1 |

EXAMPLES 24 TO 30

The procedure of Example 1 was repeated except that a metal salt of higher fatty acid (D) shown in Table 3 was used with the hydrotalcite solid solution (C) in an amount of 500 ppm per the total amount of the EVOH (A-1) and the olefin resin (B-1) to give a film (Examples 24 to 26).

The procedure of Example 5 was repeated except that a metal salt of higher fatty acid, $(C_{17}H_{35}COO)_2Ca$ was used with the hydrotalcite solid solution (C) in an amount of 500 ppm per the EVOH (A-1) and the olefin resin (B-1) to give a film (Example 27).

The procedure of Example 12 was repeated except that a metal salt of higher fatty acid, $(C_{17}H_{35}COO)_2Mg$ was used with the hydrotalcite solid solution (C) in an amount of 500 ppm per the EVOH (A-1) and the olefin resin (B-2) to give a film (Example 28).

The procedure of Example 16 was repeated except that a metal salt of a higher fatty acid, $(C_{17}H_{35}COO)_2Ca$ was used with the hydrotalcite solid solution (C) in an amount of 500 ppm per the EVOH (A-1) and the olefin resin (B-4) to give a film (Example 29).

The procedure of Example 23 was repeated except that a metal salt of a higher fatty acid, $(C_{17}H_{35}COO)_2Zn$ was used with the hydrotalcite solid solution (C) in an amount of 500 ppm per the EVOH (A-2) and the olefin resin (B-2) to give a film (Example 30).

Gel formation in the extruder during molding and long run processability, as to the each film, were estimated in the same manner as in Example 1.

The results are shown in Table 3.

TABLE 3

| Ex. No. | Metal salt of higher fatty acid (D) | | Gel formation | | long run processability | Fish eye |
| | Kind | Amount per (A) and (B) (ppm) | Screen | Screw | | |
| --- | --- | --- | --- | --- | --- | --- |
| Ex. 24 | $(C_{17}H_{35}COO)_2Ca$ | 500 | 1 | 1 | No fluctuation | 1 |
| Ex. 25 | $(C_{11}H_{23}COO)_2Ca$ | " | 1 | 1 | " | 1 |
| Ex. 26 | $(C_{11}H_{23}COO)_2Mg$ | " | 1 | 1 | " | 1 |
| Ex. 27 | $(C_{17}H_{35}COO)_2Ca$ | " | 1 | 1 | " | 1 |
| Ex. 28 | $(C_{17}H_{35}COO)_2Mg$ | " | 1 | 1 | " | 1 |
| Ex. 29 | $(C_{17}H_{35}COO)_2Ca$ | " | 1 | 1 | " | 1 |
| Ex. 30 | $(C_{17}H_{35}COO)_2Zn$ | " | 2 | 1 | " | 1 |

As is apparent from Table 3, long run processability is further improved in comparison with the case in which the metal salt of higher fatty acid was not used, and the gel formation and quality of the film were as excellent as or more excellent than the case in which the metal salt of higher fatty acid was not used.

EXAMPLES 31 TO 40

A three-layer film having an inner layer of the EVOH (A-1) (thickness: 5 μ), an outer layer of the olefin resin (B-1) (thickness: 80 μ) and a middle layer of a 10% maleic anhydride-grafted polyethylene (MI at 210° C.: 2.0) as an adhesive layer was prepared under the following conditions.

Molding Conditions

Extruder:Extruder having a diameter of 30 mm (for the inner layer)

Extruder having a diameter of 30 mm (for the middle layer)

Extruder having a diameter of 65 mm (for the outer layer)

Screw: L/D=28, compression ratio=3.2 (in the all extruders)

Die: Spiral three layer blown film die Die width: 300 mm

Extruder temperature: Rear part of cylinder: 220° C. Middle part of cylinder: 230° C. Front part of cylinder: 240° C. Die temperature: 220° C.

Screw speed:
30 rpm (for the inner layer and the middle layer), 100 rpm (for the outer layer)

The cut edges and scrapes of the laminate produced during molding were pulverized to give reground pieces having a particle size of about 1 to about 5 mm. The pulverized pieces were composed of the EVOH (A-1), the maleic anhydride-grafted polyethylene (adhesive) and the olefin resin (B-1) in a weight ratio of EVOH (A-1)/adhesive/olefin resin (B-1) of 8/7/100.

A hydrotalsite solid solution (C), or in addition to the solid solution (C), a metal salt of higher fatty acid (D) shown in Table 4 was mixed with the pulverized pieces in an amount shown in Table 4, and the mixture and the EVOH (A-1) were coextruded to give a two-layer laminate having an outer layer made of the above mixture and an inner layer of the EVOH (A-1). The coextrusion conditions were as follows:

Coextrusion Conditions

Extruder: Extruder having a diameter of 30 mm (for the inner layer)

Extruder having a diameter of 65 mm (for the outer layer)

Screw:L/D=28, compression ratio=3.2(in the all extruders) Die: Spiral three layer blown film die Die width: 300 mm Extruder temperature: Rear part of cylinder : 220° C. Middle part of cylinder: 230° C. Front part of cylinder: 240° C. Die temperature: 220° C.

Screw speed: 30 rpm (for the inner layer) 100 rpm (for the outer layer)

Gel formation, long run processability and quality of the film were estimated in the same manner as in Example 1.

The results are shown in Table 4.

COMPARATIVE EXAMPLE 5

The procedure of Example 31 was repeated except that the hydrotalcite solid solution (C) was not used to give a laminated film.

Gel formation, long run processability and quality of the film were estimated in the same manner as in Example 1. The results are shown in Table 4.

TABLE 4

| Ex. No. | Hydrotalcite solid solution (C) Kind | Amount per (A-1) and (B-1) (ppm) | Metal salt of higher acid (D) Kind | Amount per (A-1) and (B-1) (ppm) | Gel formation Screen | Gel formation Screw | Long run processability | Fish eyes |
|---|---|---|---|---|---|---|---|---|
| Ex. 31 | {Mg$_{0.75}$Zn$_{0.25}$}$_{0.67}$Al$_{0.33}$(OH)$_2$(CO$_3$)$_{0.165}$·0.45H$_2$O | 800 | — | 0 | 1 | 2 | No fluctuation | 1 |
| Ex. 32 | {Mg$_{0.79}$Zn$_{0.21}$}$_{0.7}$Al$_{0.3}$(OH)$_2$(CO$_3$)$_{0.15}$ | " | — | 0 | 1 | 2 | " | 1 |
| Ex. 33 | {Mg$_{5/7}$Pb$_{2/7}$}$_{0.7}$Al$_{0.30}$(OH)$_2$(CO$_3$)$_{0.15}$·0.52H$_2$O | " | — | 0 | 1 to 2 | 2 | A little fluctuation of torque occured after 170 hours | 1 |
| Ex. 34 | {Mg$_{6/7}$Cd$_{1/7}$}$_{0.7}$Al$_{0.3}$(OH)$_2$(CH$_3$COO)$_{0.3}$·0.34H$_2$O | " | — | 0 | 1 to 2 | 2 to 3 | A little fluctuation of torque occured after 140 hours | 2 |
| Ex. 35 | {Mg$_{1/7}$Ca$_{3/7}$Zn$_{3/7}$}$_{0.7}$Al$_{0.3}$(OH)$_2$$\left\{\begin{array}{c}\text{CHCOO}\\ \parallel \\ \text{CHCOO}\end{array}\right\}_{0.15}$·0.41H$_2$O | " | — | 0 | 2 | 2 | Fluctuation of resin pressure occured after 100 hours | 2 |
| Ex. 36 | {Mg$_{0.75}$Zn$_{0.25}$}$_{0.67}$Al$_{0.33}$(OH)$_2$(CO$_3$)$_{0.165}$·0.45H$_2$O | 800 | (C$_{17}$H$_{35}$COO)$_2$Ca | 800 | 1 | 2 | No fluctuation | 1 |
| Ex. 37 | {Mg$_{0.79}$Zn$_{0.21}$}$_{0.7}$Al$_{0.3}$(OH)$_2$(CO$_3$)$_{0.15}$ | " | " | " | 1 | 2 | " | 1 |
| Ex. 38 | {Mg$_{5/7}$Pb$_{2/7}$}$_{0.7}$Al$_{0.30}$(OH)$_2$(CO$_3$)$_{0.15}$·0.52H$_2$O | " | " | " | 1 | 2 | " | 1 |
| Ex. 39 | {Mg$_{6/7}$Cd$_{1/7}$}$_{0.7}$Al$_{0.3}$(OH)$_2$(CH$_3$COO)$_{0.3}$·0.34H$_2$O | " | " | " | 1 | 2 | " | 1 |
| Ex. 39 | {Mg$_{1/7}$Ca$_{3/7}$Zn$_{3/7}$}$_{0.7}$Al$_{0.3}$(OH)$_2$$\left\{\begin{array}{c}\text{CHCOO}\\ \parallel \\ \text{CHCOO}\end{array}\right\}_{0.15}$·0.41H$_2$O | " | " | " | 1 | 2 | " | 1 |
| Com. Ex. 5 | — | 0 | — | 0 | 5 | 4 | Surging and lowering of discharge occured after 8 hours | 5 |

EXAMPLES 41 TO 44

The procedure of Example 31 was repeated except that the high density polyethylene (B-2) was employed instead of the polypropylene (B-1) for an outer layer and extrusion was carried out under the following conditions to give a three-layer laminate.

Molding Conditions

Extruder: The same extruder as used in Example 31
Screw: The same screws as used in Example 31
Die: The same die as used in Example 31
Extrusion temperature: Cylinder temperature, at front position: 190° C. (for inner layer), 210° C. (for middle layer), 220° C. (for outer layer),
Die temperature: 210° C.
Screw speed: 30 rpm (for inner layer)
30 rpm (for middle layer)
100 rpm (for outer layer)
Using a hydrotalcite solid solution (C) shown in Table 5, and the cut edges and scraps of the obtained three-layer laminate, a two-layer laminate having an outer layer made of the mixture of the hydrotalcite solid solution (C) and the cut edges and scraps of the three-layer laminate and an inner layer made of the EVOH (A-1) was coextruded in the same manner as in Example 31.

Gel formation, long run processability and quality of the film were estimated in the same manner as in Example 1.

The results are shown in Table 5.

20 to 80% by mole and a degree of hydrolysis in the vinyl acetate units of at least 90% by mole and (B) an olefin resin, the improvement which comprises melt-molding said mixture in the presence of a hydrotalcite solid solution (C) having the formula (I):

$$\{(M_1^{2+})_{y1}(M_2^{2+})_{y2}\}_{1-x}(M^{3+})_x(OH)_2(A^{n-})_{x/n} \cdot mH_2O \qquad (I)$$

wherein $M_1^{2+}$ is at least one metal selected from Mg, Ca, Sr and Ba; $M_2^{2+}$ is Zn, Cd, Pb or Sn; $M^{3+}$ is a trivalent metal; $A^{n-}$ is an anion with a valence of n; x is a positive number satisfying the equation: $0 < x \leq 0.5$; y1 and y2 are positive numbers satisfying the equations: $0.5 < y1 < 1$, $y1 + y2 = 1$; and m is a positive number satisfying the equation: $0 \leq m < 2$.

2. The process of claim 1, wherein the amount of said copolymer (A) is from 0.1 to 40% by weight based on said resin (B).

3. The process of claim 1, wherein said olefin resin (B) is a polymer selected from the group consisting of a polyethylene and a polypropylene.

4. The process of claim 1, wherein the amount of said hydrotalcite solid solution (C) is from 50 to 20,000 ppm based on the total amount of said copolymer (A) and said resin (B).

5. The process of claim 1, wherein said mixture is melt-molded in the presence of a metal salt of higher fatty acid having 10 to 22 carbon atoms (D) in addition to said hydrotalcite solid solution (C).

TABLE 5

| Ex. No. | Hydrotalcite solid solution (C) Kind | Amount per (A-1) and (B-2) (ppm) | Gel formation Screen | Gel formation Screw | Long run processability | Fish eyes |
|---|---|---|---|---|---|---|
| Ex. 41 | $\{Mg_{0.75}Zn_{0.25}\}_{0.67}Al_{0.33}(OH)_2(CO_3)_{0.165} \cdot 0.45H_2O$ | 500 | 1 | 2 | No fluctuation | 1 |
| Ex. 42 | $\{Mg_{0.79}Zn_{0.21}\}_{0.7}Al_{0.3}(OH)_2(CO_3)_{0.15}$ | " | 1 | 2 | " | 1 |
| Ex. 43 | $\{Mg_{6/7}Cd_{1/7}\}_{0.7}Al_{0.3}(OH)_2(CH_3COO)_{0.3} \cdot 0.34H_2O$ | " | 1 to 2 | 2 | A little fluctuation of torque occured after 170 hours | 2 |
| Ex. 44 | $\{Mg_{1/7}Ca_{3/7}Zn_{3/7}\}_{0.7}Al_{0.3}(OH)_2(\underset{\|}{\overset{CHCOO}{CHCOO}})_{0.15} \cdot 0.41H_2O$ | | 1 to 2 | 2 | A little fluctuation of torque occured after 150 hours | 2 |

In addition to the ingredients used in the Examples, other ingredients can be used in the Examples as set forth in the specification to obtain substantially the same results.

What we claim is:

1. In a process for preparing a molded article by melt-molding a mixture of (A) a hydrolyzed ethylene-vinyl acetate copolymer having an ethylene content of 6. The process of claim 5, wherein the amount of said metal salt of higher fatty acid (D) is from 50 to 10,000 ppm based on the total amount of said hydrolyzed copolymer (A) and said olefin resin (B).

7. The process of claim 5, wherein said metal salt of higher fatty acid (D) is a metal salt of stearic acid.

* * * * *